United States Patent
Manther et al.

(10) Patent No.: US 8,944,405 B2
(45) Date of Patent: Feb. 3, 2015

(54) SOLENOID VALVE PLATE

(71) Applicant: Schaeffler Technologies AG & Co. KG, Herzogenaurach (DE)

(72) Inventors: Debora Manther, Royal Oak, MI (US); Peter Stegmann, Nürnberg (DE); Jens Hoppe, Erlangen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/078,643

(22) Filed: Nov. 13, 2013

(65) Prior Publication Data

US 2014/0131602 A1 May 15, 2014

Related U.S. Application Data

(60) Provisional application No. 61/726,303, filed on Nov. 14, 2012.

(51) Int. Cl.
*F16K 31/06* (2006.01)

(52) U.S. Cl.
CPC .................................. *F16K 31/06* (2013.01)
USPC ...................... 251/129.21; 251/333; 251/359

(58) Field of Classification Search
USPC ........... 251/84–86, 129.15, 129.21, 333–334, 251/359–360
See application file for complete search history.

(56) References Cited

U.S. PATENT DOCUMENTS

| | | | |
|---|---|---|---|
| 3,548,869 A * | 12/1970 | Anderson, Jr. et al. | 251/332 |
| 3,620,251 A * | 11/1971 | Bowen | 251/333 |
| 3,632,081 A * | 1/1972 | Evans | 251/333 |
| 4,218,021 A * | 8/1980 | Palma | 251/129.14 |
| 4,666,125 A * | 5/1987 | Marts et al. | 251/129.15 |
| 4,714,237 A * | 12/1987 | Linderman et al. | 251/362 |
| 5,188,150 A * | 2/1993 | Esplin | 251/360 |
| 5,549,274 A * | 8/1996 | Buchanan et al. | 251/360 |
| 5,845,672 A | 12/1998 | Reuter et al. | |
| 5,954,312 A | 9/1999 | Earnhardt | |
| 6,217,001 B1 | 4/2001 | Gluchowski et al. | |
| 6,367,434 B1 | 4/2002 | Steigerwald et al. | |
| 7,137,411 B2 | 11/2006 | Golovatai-Schmidt et al. | |
| 2002/0066805 A1 | 6/2002 | Hornby | |
| 2007/0138422 A1* | 6/2007 | Najmolhoda et al. | 251/129.15 |
| 2007/0227512 A1 | 10/2007 | Steinman | |
| 2009/0189105 A1 | 7/2009 | Dayton | |

FOREIGN PATENT DOCUMENTS

WO 2013020749 A1 2/2013

OTHER PUBLICATIONS

International Search Report for PCT/US2013/069786, mailed Feb. 19, 2014 by Korean Intellectual Property Office.

\* cited by examiner

*Primary Examiner* — John Bastianelli
(74) *Attorney, Agent, or Firm* — Antun M. Peakovic

(57) ABSTRACT

An electromagnetic hydraulic valve or solenoid having an electric plug, housing, magnetic coil, armature and armature pin, valve body and associated valve seat and valve plate and associated valve seat, the valve plate axially retained, but, freely floating laterally within the housing, such that the valve plate and valve plate seat is movable to align with the valve body and valve body seat.

14 Claims, 6 Drawing Sheets

US 8,944,405 B2

SOLENOID VALVE PLATE

The present invention relates to a solenoid valve, in particular, a valve plate for a solenoid valve.

BACKGROUND

Typically, solenoid valves are electromechanically operated valves having two main parts; the solenoid and the valve. The solenoid converts electro-magnetic energy into mechanical energy which, in turn, opens or closes the valve mechanically. Solenoid valves are used in a wide variety of applications, including in switchable valvetrains of internal combustion engines. Solenoid valves are disclosed in U.S. Pat. No. 7,137,411, and U.S. Pat. No. 6,367,434 wherein the solenoid valve comprises an electromagnet having a hollow cylindrical magnet housing, at least one coil winding and an armature, and a valve member having a hollow cylindrical valve housing for receiving a spool valve which is displaceable relative to the valve housing by the armature of the electromagnet.

So called "fast switching solenoids" operate by the same principle as solenoid valves generally. PCT application PCT/EP2012/062080 describes such a fast switching solenoid, comprising a magnetic coil surrounding an armature and magnetic core, the armature connected to a armature pin, extending through the magnetic core and attached to a valve body. A perforated housing member surrounds the valve assembly, the assembly comprising a valve spring, spring seat, valve body, valve plate on which the valve body seats and a spring retainer.

In fast switching solenoid valves, a seal can be used between the magnet core, valve body and the spring seat in order to ensure isolation between the high pressure chamber, around the periphery of the perforated housing, and middle pressure chamber, at the bottom of the valve, adjacent the spring retainer. Where misalignment occurs between the valve body and the valve plate in the housing, the seal can be compressed or permanently compacted during operation of the valve body during actuation. This seal may also contribute to increased friction of the system, depending on the temperature and pressure of the oil, negatively influencing switching performance of the valve.

The valve plate is typically pressed into the housing, requiring a tight tolerance between the valve plate and the housing and sorting of parts during assembly.

SUMMARY OF THE INVENTION

Certain terminology is used in the following description for convenience and descriptive purposes only, and is not intended to be limiting to the scope of the claims. The terminology includes the words specifically noted, derivatives thereof and words of similar import.

The present invention relates to a fast switching solenoid valve, and more particularly, to a free floating valve plate for a solenoid valve. Solenoid valves have a electromagnetic portion and a valve portion, the electromagnet having an electric plug contact, a housing, magnetic coil and armature. The valve portion having a pin associated with the armature, urging against a valve body, a valve plate and a perforate housing directing flow, as required.

The valve plate is axially retained within the housing, however, it is loosely fitted within the cylindrical portion of the housing, such that it self-aligns to the abutting valve body valve seat when the solenoid is actuated, correcting for any misalignments or tolerancing issues.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner.

Figure 1:
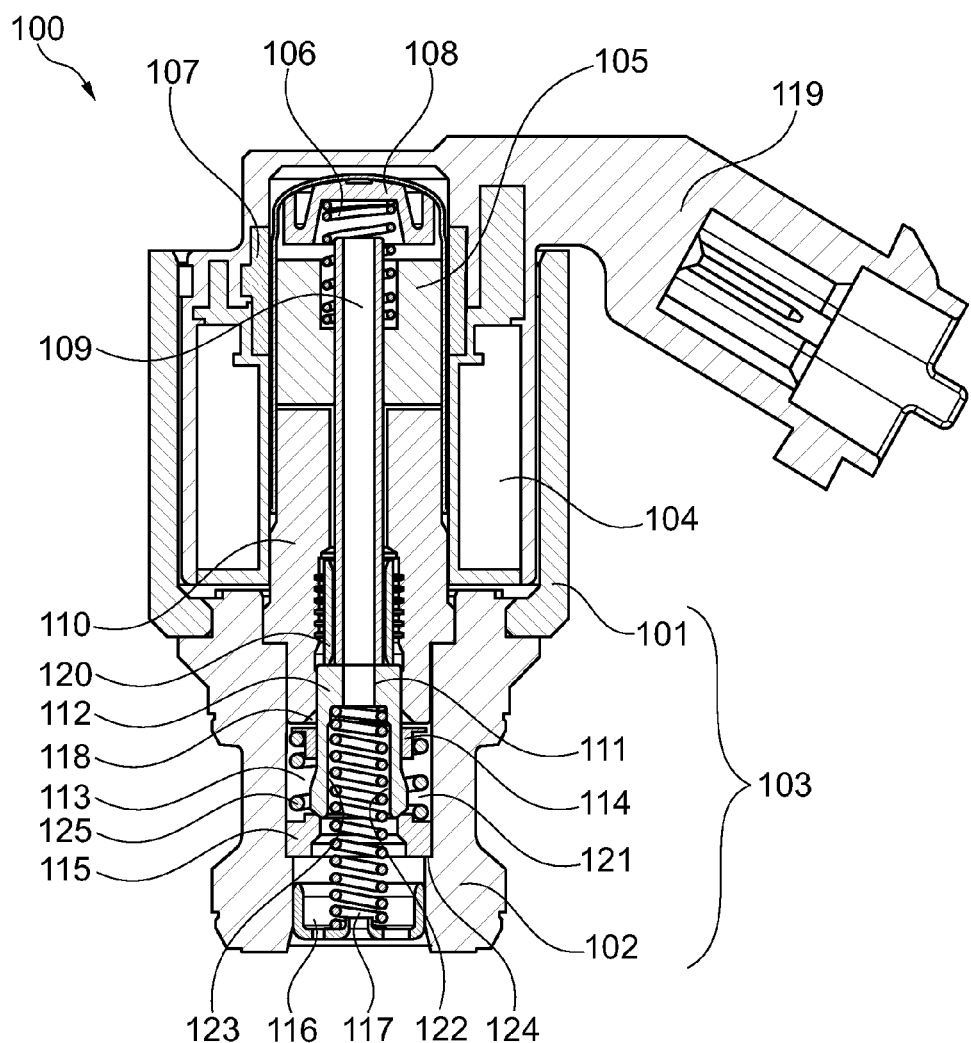
FIG. 1 is a cross sectional view of a prior art solenoid valve.

FIG. 1 is a cross sectional view of prior art solenoid 100, comprising electric plug 119, cylindrical magnet housing or yoke ring 101 and valve housing 102 assembled together, forming housing 103. Magnetic coil 104 is nested on an inner circumferential surface of yoke ring 101, in turn surrounding armature 105, armature spring 106, armature sleeve 107, capped on a upper surface by damper 108. Armature 105 is a hollow cylindrical structure, abutting hollow cylindrical magnet core 110 on a lower surface of armature 105 and an upper surface of magnet core 110. Armature pin 109 inserted through the middle of armature 105 and extending through magnet core 110, and into a center hole 111 of valve body 112. Valve plate spring 113 surrounds the outer circumferential surface of valve body 112, and is seated at an upper periphery against spring seat 114, and a lower periphery on valve plate 115. Seal ring 118 is nested between an upper surface of spring seat 114, and a lower conical surface of magnet core 110, sealing the interior cavity 120 formed by the center holes of magnet core 110 and valve body 112, from an outer cavity 121 formed by the outer surface of valve body 112 and the inner surface of valve housing 102. An upper portion of valve spring 117 is inserted into the cupped portion 122 of valve body 112, supported laterally by inner side walls 123 of valve body 112, and supported on a lower portion by spring retainer 116.

In prior art solenoid 100, valve plate 115 is press fit into inner cavity 125 of valve housing 102, abutting valve housing shoulder 124. This press fit may be accomplished by one of several methods, including, but, not limited to, sorting valve plates 115 to accommodate a measured dimension of cavity 125, and precise machining of both cavity 125 and plate 115 prior to press fitting of plate 115 into cavity 125. To compensate for any misalignment and resulting leakage of valve body 112 onto valve plate 115, or valve body 112 in magnet core 110, ring seal 118 is inserted between magnet core 110, spring seat 114 and valve body 112. Where there is a relatively large misalignment between valve body 112 and valve plate 115, seal 118 may be pinched or compressed on one end, causing increased wear and may decrease durability of seal 118.

Figure 2:
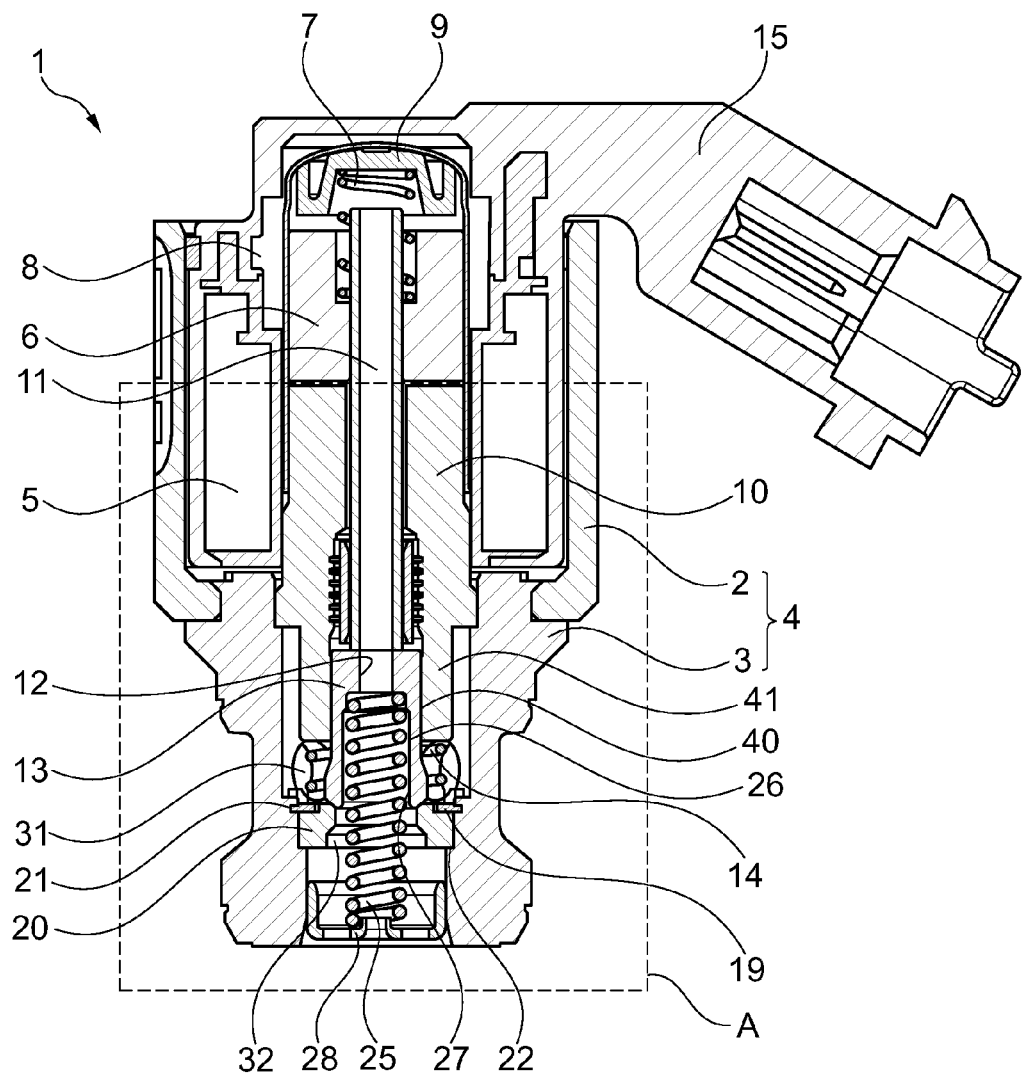
FIG. 2 is a cross-sectional view of solenoid valve assembly according to one embodiment of the invention.

FIG. 2 is a cross sectional side view of solenoid 1 according to one embodiment of the invention, comprising electric plug 15, cylindrical magnet housing or yoke ring 2 and valve housing 3 assembled together, forming housing 4. Magnetic coil 5 is nested in an inner circumferential surface of yoke ring 2, in turn surrounding armature 6, armature spring 7, armature sleeve 8, capped on a upper surface by damper 9. Armature 6 is a hollow cylindrical structure, abutting hollow cylindrical magnet core 10 on a lower surface of armature 6 and an upper surface of magnet core 10. Armature pin 11 inserted through the center of armature 6 and extending through magnet core 10, and into a center hole 12 of valve body 13. Alternatively, armature pin 11 may only come into contact with valve body 13 at a top surface of valve body 13, as shown in FIG. 2. Valve plate spring 14 surrounds the outer circumferential surface of valve body 13, and is seated at an upper periphery against magnet core 10, and at a lower periphery on valve plate retainer 19. Valve plate retainer 19 is clipped or recessed into groove 21 in valve housing 3, retaining free floating valve plate 20 between valve plate retainer 19 on an upper end and valve housing shoulder 22 on a lower end of valve plate 20. An upper portion of valve spring 25 is inserted into cupped portion 26 of valve body 13, supported laterally by inner side walls 27 of valve body 13, and supported on a lower portion by spring retainer 28.

In operation, in the embodiment shown, solenoid 1 is normally open, meaning that valve body 13 and valve plate 20 are separated by valve spring 25 acting to push valve body 13 upward. Alternatively, it is contemplated in the present invention that solenoid 1 can also be normally closed. In the activated mode shown in FIG. 2, magnetic coil 5 is energized, creating a magnetic field causing armature 6 and armature pin 11 to move downwards against valve body 13, compressing valve spring 25 and seating convex valve body seat 29 against and into concave valve plate seat 30, thus stopping fluid flow from the direction of spring retainer 28 and inner cavity 32 into outer cavity 31.

Figure 3:
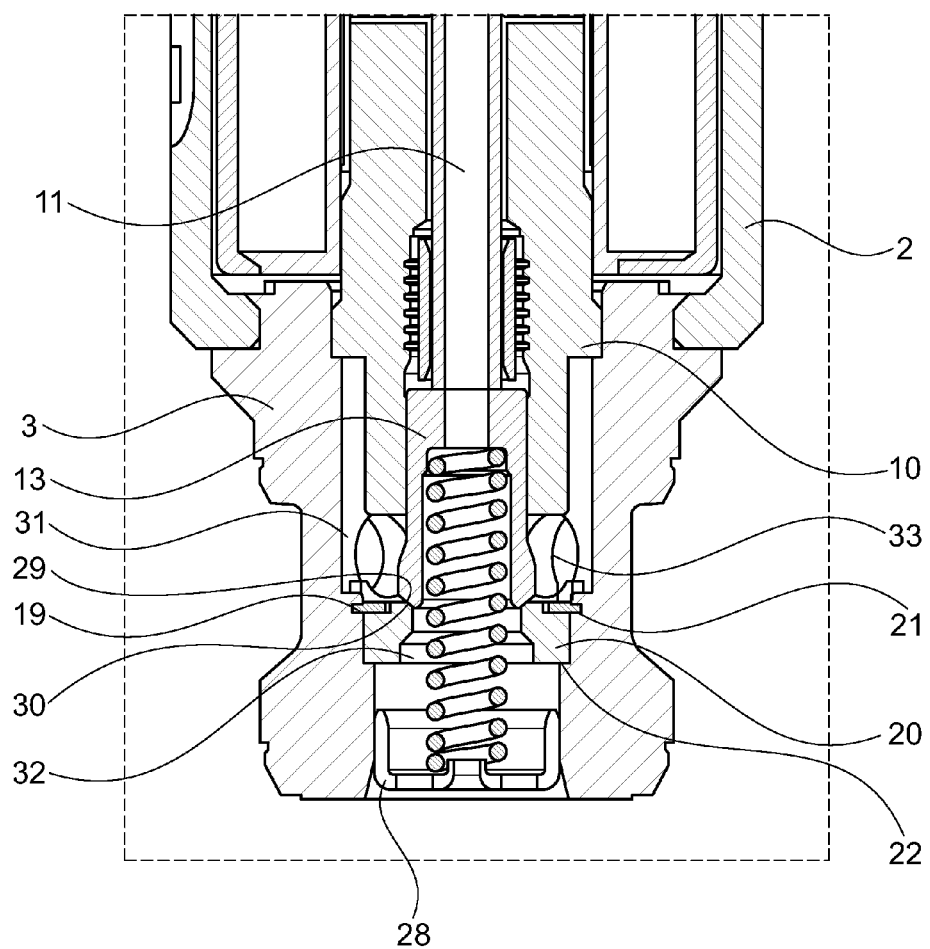
FIG. 3 is a cross sectional view of portion A of FIG. 2.

FIG. 3 is an enlarged cross sectional view of portion A of FIG. 2. Yoke ring 2, valve housing 3, magnetic coil 5, armature pin 11, and magnet core 10 are as shown in FIG. 2. For clarity, valve plate spring 14 is not shown in order to show perforations 33 in valve housing 3, which in a normally open state would be in fluid communication with fluid from spring retainer 28 and inner cavity 32. In this embodiment, valve plate retainer 19 is inserted into valve plate retainer groove 21 in housing 3, retaining free floating valve plate 20 between retainer 19 and shoulder 22. It is also contemplated in the present invention that other retention mechanisms can be used, including, but not limited to, the use of valve plate spring 14 and shoulder 22 and a valve plate 20 and retainer 19 being formed as one component.

Figure 4:
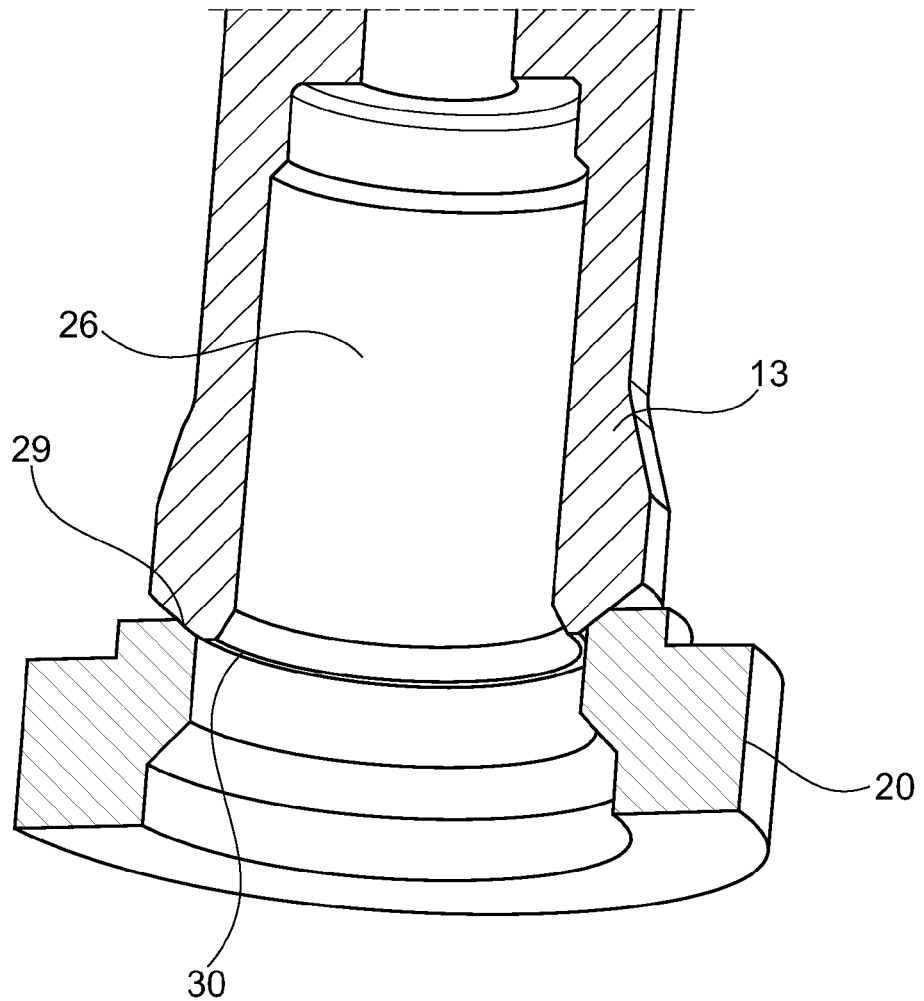
FIG. 4 is a cross sectional perspective view of valve body and valve plate of FIG. 3.

Seating of convex valve body seat 29 into concave valve plate seat 30 are better shown in FIGS. 3 and 4. In particular, FIG. 4 is a cross sectional perspective view of valve body 13 and valve plate 20 only, including valve body cupper portion 26, convex valve body seat 29 and concave valve plate seat 30.

Figure 5:
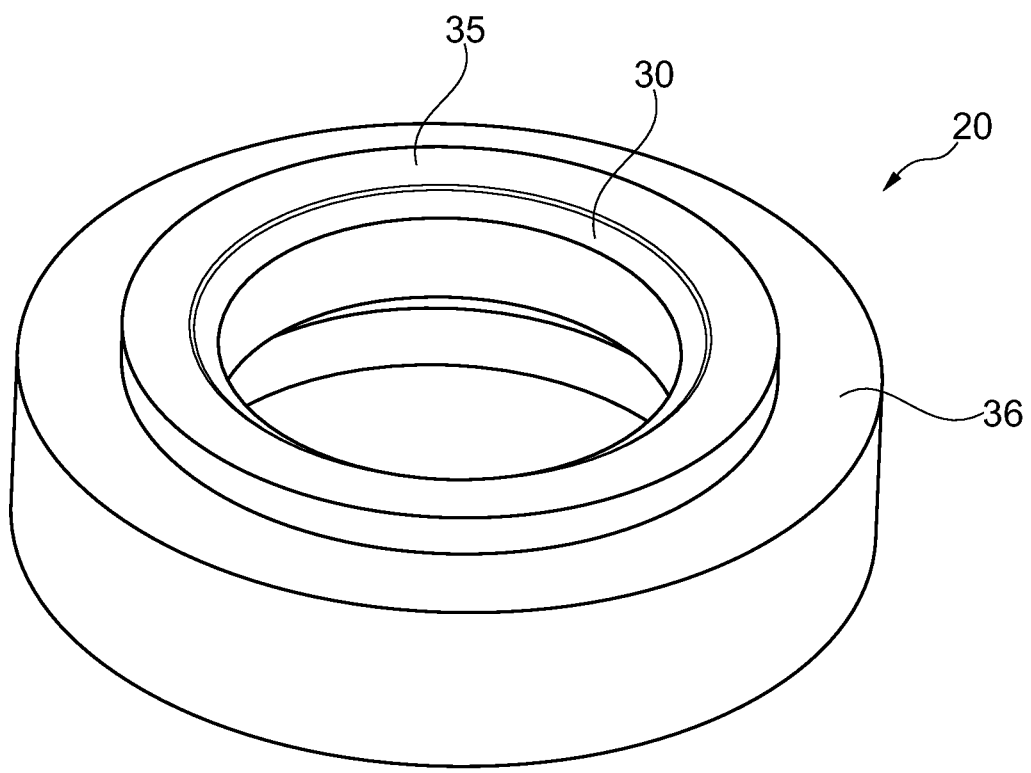
FIG. 5 is a perspective view of valve plate according to one embodiment of the invention.

FIG. 5 is a perspective view of valve plate 20 according to one embodiment of the invention. Valve plate 20 is a hollow cylindrical shape having a raised disk shape 35, forming a shoulder 36 on which can be seated valve plate retainer 19 (see FIGS. 2 and 3) or valve plate spring 14. toward the radial center of the raised disk 35 is concave valve plate seat 30, to which convex valve body seat 29 can tightly abut and stop flow between the two surfaces. Circumferential outer surface 37 is dimensioned for any particular application such that plate 20 may freely float in valve housing 3 and remain seated on valve housing shoulder 22.

As solenoid 1 is energized and valve body 13 is pushed downward by armature pin 11, compressing valve spring 25 against spring retainer 28, convex valve body seat 29 contacts at least a portion of valve plate seat 30. As valve plate 20 moves freely laterally and is confined from movement upward or downward by shoulder 22 and retainer 19 and/or spring 14 so that no skewing occurs, valve plate 20 shifts laterally such that valve plate seat 30 aligns properly with valve body seat 29, and the two surfaces are in continuous contact around their full circumference, this closing that fluid communication from inner cavity 32 to outer cavity 31 (see FIG. 3). In this embodiment gap seal 40, which is the gap between valve body 13 and magnet core 10, which restricts flow from outer cavity 31 (see FIG. 2), is elongated by lengthening magnet core extension 41, providing further flow restriction.

Figure 6:
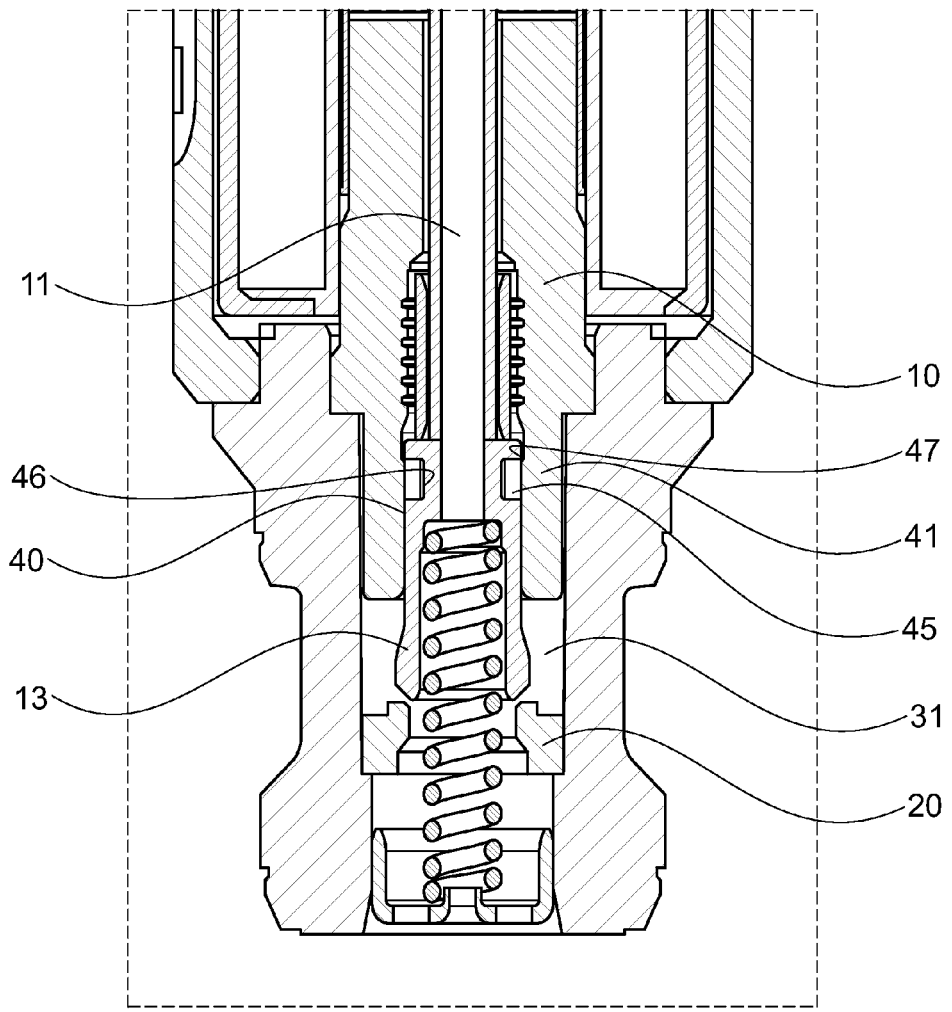
FIG. 6 is a cross section view of solenoid valve assembly according to a second embodiment of the invention.

FIG. 6 is a cross sectional view of solenoid 1' according to a second embodiment of the invention. In this embodiment, the components similar to the embodiment described in FIG. 2, including valve body 13', valve plate 20, magnet core 10 and armature pin 11. In this embodiment, piston ring seal 45 is inserted into groove 46 on valve body 13', providing additional sealing from outer cavity 31. Piston ring seal 45 contacts an inner surface 47 of magnet core extension 41. Alternatively, seal 45 can be inserted into a groove (not shown) on surface 47 in magnet core extension 41, and seal 45 may contact an outer surface of valve body 13'.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1 Solenoid
2 Yoke Ring or Magnet Housing
3 Valve Housing
4 Housing
5 Magnetic Coil
6 Armature
7 Armature Spring
8 Armature Sleeve
9 Damper
10 Magnet Core
11 Armature Pin
12 Valve Body Center Hole
13 Valve Body 14 Valve Plate Spring
15 Electric Plug
19 Valve Plate Retainer
20 Valve Plate
21 Valve Plate Retainer Groove
22 Valve Housing Shoulder
25 Valve Spring
26 Valve Body Cupped Portion
27 Valve Body Inner Side Walls
28 Spring Retainer
29 Valve Body Seat
30 Valve Plate Seat
31 Outer Cavity
32 Inner Cavity
33 Perforations
35 Valve Plate Disk
36 Valve Plate Shoulder
37 Valve Plate Circumferential Outer Surface
40 Gap Seal
41 Magnet Core Extension
45 Piston Ring Seal
46 Groove
47 Magnet Core Inner Surface
100 Solenoid
101 Yoke Ring or Magnet Housing
102 Valve Housing
103 Housing
104 Magnet Coil
105 Armature
106 Armature Spring
107 Armature Sleeve
108 Damper
109 Armature Pin
110 Magnet Core
111 Valve Body Center Hole
112 Valve Body
113 Valve Plate Spring
114 Spring Seat
115 Valve Plate
116 Spring Retainer
117 Valve Spring
118 Seal Ring
119 Electric Plug
120 Interior Cavity
121 Outer Cavity
122 Valve Body Cupped Portion
123 Valve Body Inner Side Walls
124 Valve Housing Shoulder
125 Valve Housing Inner Cavity

What we claim is:

1. An electromagnetic hydraulic valve for an internal combustion engine comprising;
   an electromagnet comprising;
      a hollow cylindrical magnet housing or yoke ring;
      an electric plug contact;
      at least one hollow cylindrical coil winding inserted inside the magnet housing;
   a hydraulic valve comprising;
      a perforated hollow cylindrical valve housing connected at one end to the magnet housing;
      a hollow cylindrical armature inserted through the coil winding and axially movable according to a magnetic field generated by the coil winding;
      a pin inserted through a center of the armature;
      a valve body having a valve seat at one end;
      a valve plate having a valve seat at one end;
      the valve plate seat and valve body seat axially aligned and facing one another;
      the pin fixedly inserted through the armature and adapted to axially move the valve body;
      the valve plate seated against at least one axial retention means on a lower end of the valve plate, and having a loose fit inside the hollow cylindrical center of the valve housing, the valve plate laterally movable to align with the valve body seat along an entire circumference of the abuttable valve seats.

2. The hydraulic valve of of claim 1, further comprising at least two axial stopping means to limit axial movement of the armature.

3. The hydraulic valve of claim 2, wherein, at least on of the the armature axial stopping means are a cap and spring assembly.

4. The hydraulic valve of claim 1, wherein, the valve body is a cup shaped hollow cylindrical body.

5. The hydraulic valve of claim 4, wherein, the valve includes a valve spring nested inside the hollow center of the valve body, urging the valve body away from the valve plate.

6. The hydraulic valve of claim 4, wherein the valve includes a valve spring urging the valve body against the valve plate.

7. The hydraulic valve of claim 1, wherein, at least one axial retention means for the valve plate is a shoulder formed in the inner cylindrical surface of the valve housing, located at a lower periphery of the valve plate.

8. The hydraulic valve of claim 7, wherein, an additional axial retention means for the valve plate is a spring urging the valve plate against the valve housing shoulder.

9. The hydraulic valve of claim 1, wherein, at least one axial retention means for the valve plate is a retention washer seated in a groove in the inner cylindrical surface of the valve housing, located at an upper periphery of the valve plate.

10. The hydraulic valve of claim 1, wherein, the washer is fixed in the groove by a staking operation.

11. The hydraulic valve of claim 1, wherein, the valve body seat is convex and the valve plate seat is concave.

12. The hydraulic valve of claim 1, wherein, the valve plate is a hollow cylindrical disk shape.

13. The hydraulic valve of claim 1, wherein, the valve body has an annular groove in a radially outer surface extending around the entire circumference of the valve body.

14. The hydraulic valve of claim 13, wherein, a ring seal is inserted into the groove.

* * * * *